United States Patent
Austin, Jr. et al.

[19]

[11] Patent Number: 5,823,699
[45] Date of Patent: Oct. 20, 1998

[54] POST HEIGHT ADJUSTMENT FOR DENTAL EQUIPMENT

[75] Inventors: George K. Austin, Jr., Newberg; Stephen N. Weiler, Tualatin, both of Oreg.

[73] Assignee: A-Dec, Inc., Newberg, Oreg.

[21] Appl. No.: 417,981

[22] Filed: Apr. 6, 1995

[51] Int. Cl.⁶ ...................................................... F16B 7/10
[52] U.S. Cl. ........................ 403/109; 403/365; 403/368; 403/377
[58] Field of Search ............................. 403/12, 109, 362, 403/365, 367, 368, 371, 372, 377; 285/302, 303, 323, 343

[56] References Cited

U.S. PATENT DOCUMENTS

| | | |
|---|---|---|
| 699,911 | 5/1902 | Davis . |
| 939,933 | 11/1909 | Trautner . |
| 1,542,553 | 6/1925 | Hornbeck .............................. 285/303 |
| 1,891,048 | 12/1932 | Keefe . |
| 2,070,077 | 2/1937 | Davis . |
| 2,542,967 | 2/1951 | Waechter . |
| 3,004,330 | 10/1961 | Wilkins . |
| 3,058,386 | 10/1962 | Morrow .............................. 403/368 X |
| 3,180,659 | 4/1965 | Vigneron . |
| 3,317,261 | 5/1967 | Peterson . |
| 3,355,201 | 11/1967 | Barwick . |
| 3,356,434 | 12/1967 | Theodores . |
| 3,501,182 | 3/1970 | Buchsbaum . |
| 3,539,185 | 11/1970 | Andis . |
| 3,563,575 | 2/1971 | Sanford . |
| 3,691,883 | 9/1972 | Ingram ................................ 403/366 X |
| 3,740,085 | 6/1973 | Evans .................................. 403/366 X |
| 4,094,330 | 6/1978 | Walker . |
| 4,182,364 | 1/1980 | Gilbert et al. ....................... 285/303 X |
| 4,244,607 | 1/1981 | Blose . |
| 4,640,211 | 2/1987 | Namur ................................ 403/109 X |
| 4,655,632 | 4/1987 | Smith .................................. 403/366 X |
| 4,706,367 | 11/1987 | Garringer ........................... 403/109 X |
| 4,750,380 | 6/1988 | Hoblingre et al. .................. 403/368 X |
| 4,848,692 | 7/1989 | Hamamura et al. ................ 403/366 X |
| 4,906,028 | 3/1990 | Yokomatsu et al. ................ 285/323 X |
| 5,069,570 | 12/1991 | Pryor . |
| 5,340,072 | 8/1994 | Halbirt . |

*Primary Examiner*—Daniel P. Stodola
*Assistant Examiner*—Bruce A. Lev
*Attorney, Agent, or Firm*—Klarquist Sparkman Campbell Leigh & Whinston, LLP

[57] ABSTRACT

An expandable stop ring slides over the end of a top post until it engages a selected one of a number of spaced apart grooves in the end of a top post. The end of the top post is inserted into a bottom tubular post until the stop ring fits inside a keeper that is mounted to the upper end of the bottom post. The keeper prevents expansion of the stop ring, hence the stop ring and keeper combination support the top post and any equipment carried thereon. The top post height adjustment is made by lifting the top post to remove the stop ring from the keeper, thereby permitting sliding movement of the stop ring to another selected groove on the top post.

14 Claims, 1 Drawing Sheet

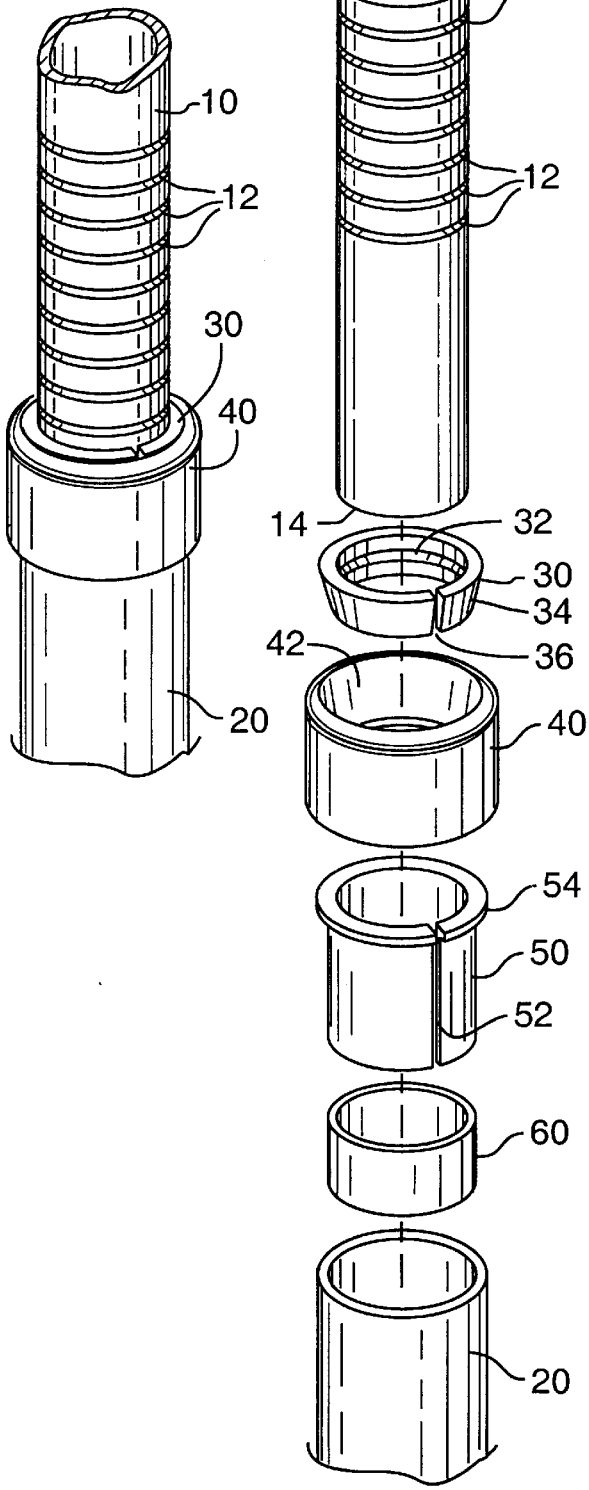
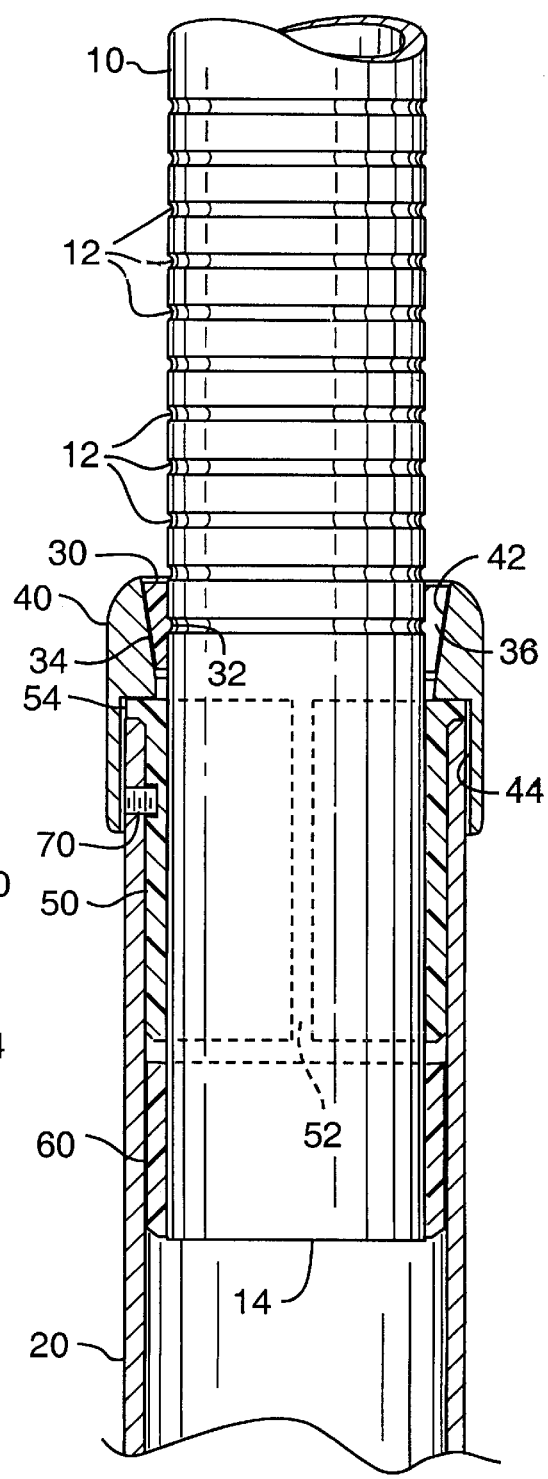

POST HEIGHT ADJUSTMENT FOR DENTAL EQUIPMENT

TECHNICAL FIELD

This invention relates to a mechanism for adjusting the height of a post that may be used to support, for example, dental equipment.

BACKGROUND INFORMATION AND SUMMARY OF THE INVENTION

In the field of dentistry, many components, such as the control unit that carries dental instruments, are primarily supported on posts. In many instances, the elevation of the control unit is adjusted via the incorporation of a mechanical arm that employs a parallel linkage arrangement, such as depicted in U.S. Pat. No. 5,340,072, herein incorporated by reference. Such arm mechanisms, although effective, introduce mechanical complexity, and sometimes require adjustment of, for example, the spring mechanism employed for counterbalancing the weight of the supported unit.

This invention is directed to an elegantly simple and effective system for changing the height of a post that may be used to support dental equipment. The invention is particularly adapted for use with a two-part post, whereby one, top post, is inserted into a second, bottom post. Height adjustment is accomplished quickly and easily, without the use of tools and without the incorporation of complicated mechanical arms or linkage assemblies.

BRIEF DESCRIPTION OF THE DRAWINGS

FIG. 1 is a perspective view of the post height adjustment system of the present invention.

FIG. 2 is an exploded perspective view showing the primary components of the system of FIG. 1.

FIG. 3 is a side view, partly in section, of the assembly depicted in FIG. 1.

DESCRIPTION OF PREFERRED EMBODIMENTS

Referring to FIGS. 1–3, there is shown a post assembly incorporating the height adjustment system of the present invention. Included is a top post 10 that is inserted into a bottom, tubular post 20. The top tubular post 10 may carry on its uppermost end (not shown) dental equipment, such as a control unit for various dental instruments.

Near the lower end 14 of the top post there is formed a plurality of spaced-apart grooves 12, extending completely around the top post 10. A stop ring 30 formed of polymeric material (such as that manufactured by DuPont under the trademark Delrin) fits around the top post 10. More particularly, the stop ring 30 is generally frustum-shaped, having a hollow interior. The interior diameter of the stop ring 30 is generally uniform, except for an annular central rib 32 that protrudes radially inwardly. The outer surface 34 of the stop ring 30 is tapered so that the outside diameter of the stop ring diminishes in the downward direction, as best shown in FIG. 3.

A through-slot 36 is formed in the stop ring 30. The slot facilitates the expansion, by hand, of the stop ring so that the stop ring may be easily slid along the exterior of the top post 10.

The internal rib 32 of the stop ring may be aligned with a selected one of the grooves 12 in the top post 10 (a lower groove selected for raising the top post, and a higher groove selected for lowering the top post, as will become clear). Once aligned, the stop ring 30 is released so that the resilience of the stop ring causes it to snap around the top post with the rib 32 fit into the selected groove 12.

The top post is inserted into the bottom post 20 and lowered until the stop ring 30 fits into a keeper sleeve 40. The sleeve 40 rests upon the flange 54 of a resilient bushing 50 that is secured to the upper end of the bottom post 20 by a set screw 70. More particularly, the upper bushing 50 is a generally hollow cylinder, and includes an elongated slot 52 that facilitates slight compression of the bushing 50 by the set screw to increase as desired the friction force resisting rotation of the top post 10. The flange 54 of the bushing rests on the uppermost edge of the bottom post 20 and provides a seat on which the keeper sleeve 40 rests.

A second, lower bushing 60, preferably formed of resilient material, is press fit over the lower end 14 of the top post 10. The upper bushing 50 and lower bushing 60 provide smooth, low-friction rotation of the top post relative to the bottom post about a vertical axis.

As best shown in FIG. 3, the lower part 44 of the interior of the keeper sleeve 40 has a diameter slightly larger than the outside diameter of the bottom post 20, thereby to provide rotational clearance between the sleeve 40 and bottom post 20. The upper interior wall 42 of the keeper sleeve 40, however, is tapered so that the internal diameter of that wall portion 42 gradually diminishes in the downward direction; that is, the direction in which the top post 10 is inserted into the bottom post 20.

It will be appreciated upon review of FIG. 3 that the annular space defined between the upper interior wall portion 42 and the exterior of the top post 10 is frustum-shaped to generally conform to that of the stop ring 30. As a result, whenever the top post 10 with attached stop ring 30 is lowered so that the stop ring 30 fits into the just-mentioned annular space, the stop ring wedges between the top post and the keeper 40, unable to expand away from the top post 10. The top post, therefore, is supported against further insertion of that post into the bottom post 20 as a result of the wedging effect of the stop ring. Force applied downwardly to the top post 10 merely tightens the stop ring 30 against the top post 10 for even greater resistance to further downward movement of the top post 10.

Even though the stop ring 30 and keeper 40 combination suffice to support substantial downward loads placed on the top post 10, the top post may be readily removed from the bottom post for adjusting its height. Specifically, the top post 10 is merely lifted by an amount sufficient to expose the stop ring 30 and permit relocation of the stop ring, hence adjustment of the height of the top post. More particularly, one may alter the height of the top post by lifting the top post upwardly (apart from the weight of the top post, no mechanism of the height adjustment system resists this lifting) until the stop ring 30 is completely exposed. The exposed stop ring may thereafter be slid along the top post 10 until the rib 32 fits into the selected groove 12. The top post is then lowered until the stop ring again seats within the keeper 40.

Although the foregoing has been described in connection with preferred and alternative embodiments, it will be appreciated by one of ordinary skill in the art that various modifications may be substituted for the mechanisms and method described here without departing from the invention as defined by the appended claims and their equivalents.

The invention claimed is:

1. A system for adjusting the height of a post, comprising:

a tubular bottom post;

a top post insertable into the bottom post and having a plurality of outer grooves formed therein;

an expandable stop ring removably attached to the top post around one of the grooves, the stop ring being split to facilitate expansion of the stop ring, thereby to permit relocation of the stop ring to another one of the grooves on the top post; and a keeper carried by the bottom post and defining between the top post and the keeper an annular space into which fits the attached stop ring, the keeper preventing expansion of the stop ring away from the top post when the stop ring is fit into the annular space.

2. The system of claim 1 wherein the stop ring is configured to define a generally hollow frustum and wherein the shape of the annular space corresponds to that of the stop ring.

3. The system of claim 2 wherein the annular space is defined in part by an interior wall of the keeper having a diameter that diminishes in the direction that the top post is inserted into the bottom post so that the stop ring is tightened against the top post as the top post is forced into the bottom post while the stop ring is within the annular space.

4. The system of claim 1 wherein the stop ring includes an inwardly protruding rib that fits into one of the grooves in the top post.

5. The system of claim 1 further comprising at least one bushing located between the bottom and top posts to facilitate relative rotation of the posts.

6. The system of claim 1 wherein the stop ring is a polymeric member.

7. The system of claim 1 wherein the top and bottom posts are upright such that when the top post is inserted into the bottom post, gravity acts downwardly along the length of the posts to keep the stop ring in the keeper.

8. The system of claim 1 wherein the keeper defines a clearance slot between the keeper and the bottom post to facilitate relative rotation of the posts.

9. The system of claim 1 in which the top post, the bottom post, the stop ring, and the keeper are constructed and arranged to allow the top post to rotate relative to the bottom post.

10. A method of adjusting the height of a top post that is inserted in a downward direction into a bottom post, comprising the steps of:

attaching a keeper to the bottom post for defining between the top and bottom posts an annular space having gradually diminishing diameter in the downward direction;

attaching a stop ring to the top post;

fitting the attached stop ring into the annular space so that the keeper keeps the stop ring against the top post to prevent further downward movement of the top post relative to the bottom post while permitting without resisting upward lifting of the top post;

orienting the top post and bottom post such that gravity keeps the stop ring against the keeper; and lifting the top post to move the stop ring out of the space thereby to permit relocation of the stop ring on the top post.

11. The method of claim 10 further comprising the steps of:

providing grooves on the top post; and providing an internal rib on the stop ring, which rib fits into one of the grooves.

12. The method of claim 9 further comprising the steps of providing a flexible stop ring thereby to facilitate expansion of the stop ring for moving the stop ring to any selected groove on the top post.

13. A system for adjusting the height of a post, comprising:

a tubular bottom post;

a top post insertable into the bottom post and having a plurality of outer grooves formed therein;

an expandable stop ring removably attached to the top post around one of the grooves, the stop ring being split to facilitate expansion of the stop ring, thereby to permit relocation of the stop ring to another one of the grooves on the top post;

a keeper carried by the bottom post and defining between the top post and the keeper an annular space into which fits the attached stop ring, the keeper preventing expansion of the stop ring away from the top post when the stop ring is fit into the annular space;

a slit bushing secured within the bottom post; and a screw extending through the bottom post and into the bushing for compressing the bushing against the top post.

14. A system for adjusting the height of a rotatable post, the system comprising:

an upright tubular bottom post;

an upright top post insertable into the bottom post and having a plurality of outer grooves formed therein;

an expandable stop ring removably attached to the top post around one of the grooves; and a keeper carried by the bottom post and defining between the top post and the keeper an annular space into which fits the attached stop ring, the keeper preventing expansion of the stop ring away from the top post when the ring is fit into the annular space;

the keeper and the stop ring being arranged and constructed of materials having sufficiently low coefficients of friction so as to facilitate relative rotation of the top post and stop ring with the bottom post.

* * * * *

UNITED STATES PATENT AND TRADEMARK OFFICE
CERTIFICATE OF CORRECTION

PATENT NO. : 5,823,699
DATED : Oct. 20, 1998
INVENTOR(S) : George K. Austin, Jr., et al It is certified that error appears in the above-identified patent and that said Letters Patent is hereby corrected as shown below:

In the Claims:

Column 4, line 14, change "claim 9" to --claim 11--.

Signed and Sealed this

Fifth Day of October, 1999

Attest:

Attesting Officer

Q. TODD DICKINSON

Acting Commissioner of Patents and Trademarks